United States Patent [19]

Hoyt

[11] Patent Number: 5,060,586

[45] Date of Patent: Oct. 29, 1991

[54] DISC BLADE SCRAPER DEVICE

[76] Inventor: Walter R. Hoyt, Rte. #1, Box 28, Pekin, N. Dak. 58361

[21] Appl. No.: 453,987

[22] Filed: Dec. 19, 1989

[51] Int. Cl.$^5$ .............................................. A01B 71/08
[52] U.S. Cl. .................................. 111/164; 172/560; 172/609; 172/610
[58] Field of Search ............................... 111/163–168; 172/609, 610, 560, 566, 558

[56]  References Cited

U.S. PATENT DOCUMENTS

| 624,117 | 5/1899 | Stephenson | 172/566 |
| 2,540,262 | 2/1951 | Higginson | 172/560 |
| 4,206,817 | 6/1980 | Bowerman | 172/560 X |
| 4,337,835 | 7/1982 | Steilen | 172/560 |

Primary Examiner—Dennis L. Taylor
Assistant Examiner—Jeffrey L. Thompson
Attorney, Agent, or Firm—Robert E. Kleve

[57]  ABSTRACT

The invention comprises an adjustable scraper device for scraping the disc blades of a grain drill. The device has a fixed mounting on the mounting for supporting the disc blades and a slidable mounting slidable along the fixed mounting to a selected adjusted position relative to the disc blade support mounting and the disc blades. Scrapers are mounted to the slidable mounting between the disc blades to be slid with the slidable mounting toward the center axis of the disc blades so that as the disc blade outer circumferential edge wears down, the scrapers, which act to scrape the disc blades, may be adjusted toward the center axis of the disc blades to keep the entire scraping portion of the scrapers within the confines of the outer circumferential edge of the disc blades, so that the scraping portion of the scraper will not wear on the outer edge of the disc blades and cause damage to the scraping portion of the scraper.

2 Claims, 1 Drawing Sheet

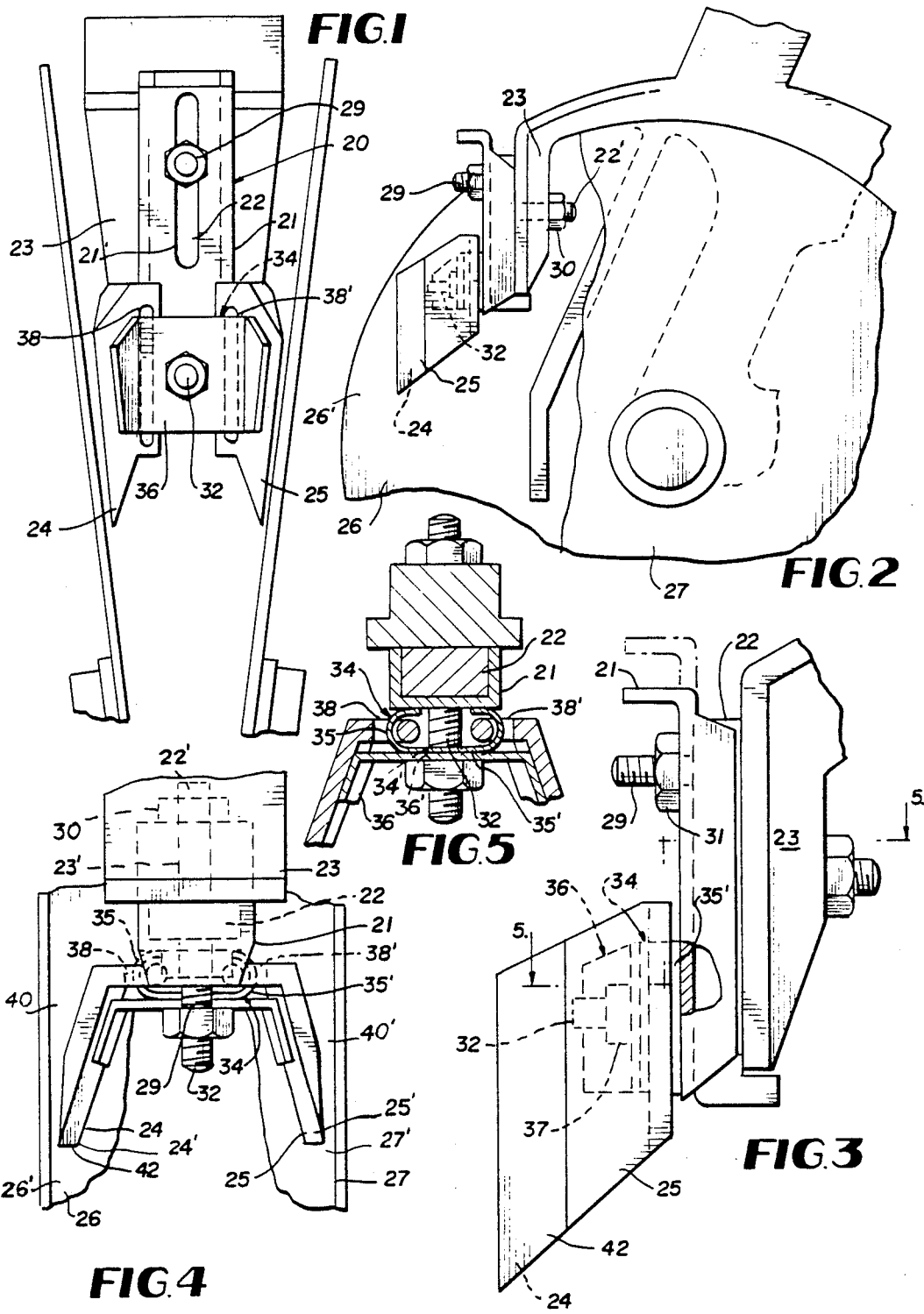

DISC BLADE SCRAPER DEVICE

This invention relates to disc blade scraping devices for scraping the disc blades of a grain drill and other seeders.

It is an object of the invention to provide a novel disc blade scraping device for scraping the disc blades of a grain drill that has scrapers that can be adjusted relative to the disc blades being cleaned by the scrapers to adjust to a change in position of the outer circumferential edge of the disc blades.

It is another object of the invention to provide a novel scraper device for scraping grain drill discs, that can be adjusted in position relative to the disc.

It is a further object of the invention to provide a novel adjustment device for scrapers of the disc blades of a grain drill and other seeders.

Further objects and advantages of the invention will become apparent as the description proceeds and when taken in conjunction with the accompanying drawings wherein:

FIG. 1 is a front elevational view of the adjustable scraper for scraping grain drill disc blades, with a showing of the support mounting for the grain drill disc blades, the disc blades and the adjustable scrapers mounted to the support mounting in slidable, adjustable relation.

FIG. 2 is a side elevational view of the adjustable scraper device for scraping the disc blades of a grain drill with the scrapers mounted mounted between the disc blades in slidable adjustable relation, and showing the disc blades, their support, and the chute for feeding seed in betweeen the disc blades.

FIG. 3 is an enlarged side elevational view of the adjustable disc blade scraper apparatus.

FIG. 4 is an enlarged top view of the adjustable disc blade scraper apparatus.

FIG. 5 is a cross sectional view taken along line 5—5 of FIG. 3.

Briefly stated, the invention comprises an adjustable disc blade scrape device for scraping grain drill disc blades where a fixed mounting for mounting the disc blades is positioned between the disc blades, a slidable mounting is slidably mounted to the fixed mounting to be adjustably slid toward the center axis of the disc blades and a pair of scrapers for scraping the disc blades are mounted to the sliding support to be slid with the sliding support toward the center axis of the disc blades so that as the outer circumferential edge of the disc blades wear down, the scrapers may be adjusted toward the center axis by adjusting the sliding support so as to maintain the scraping portions of the scrapers entirely within the confines of the outer circumferential edge of the disc blades as the edge wears down toward the center axis to prevent the scraper's scraping portion from wearing against the outer edge of the disc blades and causing unevenness in the scraping surface.

Referring more particularly to the drawing, in FIGS. 1-4 the adjustable disc blade scraper device 20 is illustrated having a slidable mounting plate 21 having a U shaped cross-section and slidably mounted to a fixed plate 22, which fixed plate 22 is fixed to the support housing 23 of the grain drill. A pair of scrapers 24 and 25 are mounted to the slidable mounting plate 21.

The support housing 23 of the grain drill is conventional having a pair of disc blades 26 and 27 rotatably mounted to the bottom of the housing 23 for causing an opening in the ground, and a chute mounted to the housing for feeding seed in between the disc blades into the opening in the ground from the seed box of a grain drill (not shown). The adjustable disc blade scraper 20 has its scrapers mounted to the slidable plate which in turn is mounted to the fixed plate and housing. The scrapers 24 and 25 are mounted near the outer circumferential edges 26' and 27' of the disc blades so that the scraping portions 24' and 25' of the scrapers is entirely within the confines of the outer circumferential edges.

The fixed mounting plate 22 has a bolt 22' fixed thereto which projects through a bore 23' in the housing 23 and a nut 30 is threaded onto the bolt 22' to fix the mounting plate 22 to the housing or support for the disc blades. The fixed plate 22 has another bolt 29 which is fixed to its front face and projects through an elongated slot 21' in the sliding plate 21 and a threaded nut 31 is threaded onto the bolt 29 to adjustably mount the sliding plate 21 to the fixed plate 22 at a selected height relative to the fixed plate and disc blades 26 and 27 with the limits of the movement of sliding plate along the bolts by the limit of the slot 21'. A second bolt 32 is fixed to the bottom portion 33 of the sliding plate 21 and projects forward, and a hinge plate 34 has a bore 34' to receive the bolt 32. The hinge plate 34 has a pair of curved ends 35 and 35'. The scrapers 24 and 25 have mounting slots 38 and 38' which receive the curved ends 35 and 35' of the hinged plate to pivotally mount the scrapers to the hinge plate plate about the axes of the curved ends 35 and 35' of the hinge plate, which mounting of the scrapers to the curved ends is also conventional. A conventional front metal limiting spring plate 36 has a bore 36' to receive the bolt 32, and a nut 37 is threaded onto the bolt 32 to secure the plate 36 and plate 34 to the sliding plate with the scrapers secured to the sliding plate in pivotal relation.

The scraper blades 24 and 25 act to scrape the inside surfaces 40 and 40' of the disc blades to remove dirt which may be attached to the blades as the blades engage the ground to cause an opening in the ground so that the grain may be introduced into the ground through the chute. The spring limiting plate is urged outward against the scrapers from its position shown in FIGS. 4 and 5 so that the scrapers are urged against the inside surfaces of the disc blades by the plate urging against the scrapers.

It has been found that as the grain drills are used to seed the ground, the engagement of the disc blades with the ground over an extended period of time causes the outer circumferential edge 26' and 27' of the disc blades to wear down, so that the scraping portions 42 of the scrapers 24 and 25 are no longer entirely within the confines of the outer circumferential edges of the disc blades as illustrated, but the scraping portions project above or over the edges 26' and 27' if not adjusted and the edges of the disc blades over extended periods wear against the scraping portions 42 and cause notches in the scraping portions 42 which interferes with the scraping action of the scrapers as to their effectiveness and the notches sometimes cause the disc blades to lock in the notches and no longer rotate when they engage the ground which interferes with the action of the disc blades. Also, the notches and unevenness that the edges 26' and 27' wear into the scraping surfaces 42 reduces the effectiveness of the scrapers to scrape dirt from the disc blades.

The sliding plate 21, by its sliding adjustment and consequently the sliding adjustment of the scrapers, enables the scrapers, by the adjustment of the sliding plate toward the center axes of the disc blades, to adjust toward the center axes of the disc blades so as to maintain the entire scraping surfaces 42 of the scrapers within the confines of the outer circumferential edges 26' and 27' of the disc blades so that the edges cannot wear into the scraping surfaces and cause the notches and reduce the effectiveness of the scraping action of the scrapers, as the outer circumferential edge of the disc blades wears down, and which edges, if the scrapers were not adjusted, would otherwise engage against the scraping surfaces 42 and cause the unevenness.

Thus it will be seen that a novel adjustable scraper device has been provided which enables the scrapers of the disc blades of a grain drill to be adjusted as the disc blades wear down to maintain the effectiveness of the scrapers and prevent damaging wear to the scrapers scraping surfaces It will be obvious that various changes and departure may be made to the invention without departing from the spirit and scope thereof, and accordingly, it is not intended that the invention be limited to that specifically described in the specification or as illustrated in the drawing but only as set forth in the appended claims wherein:

What is claimed is:

1. An adjustable disc blade scraper for scraping the disc blades of a grain drill wherein the grain drill has a fixed support means between each pair of disc blades with an aperature therethrough, comprising a fixed plate having projecting front and rear bolts at its forward and rearward faces, respectively said rear bolt being adapted to extend through said aperture of the fixed support means with means on the rear bolt to secure the fixed plate to the fixed support means, an elongated sliding plate having an elongated slot therethrough, the front bolt on said fixed plate projecting through said elongated slot of the sliding plate with the sliding plate being slidable longitudinally along the fixed plate within the limits of the slot, means on the front bolt on said fixed plate to secure the sliding plate to the fixed plate at an adjusted longitudinal position, said sliding plate having a bolt fixed thereto adjacent said slot, a pair of scraper blades having slotted ends, a scraper mounting hinge plate having curved ends to be received in the slotted ends of the scraper blades to pivotally mount the scraper blades to the mounting hinge plate, a spring plate, having outer ends said scraper mounting hinge plate and said spring plate each having bores to receive the bolt of the sliding plate with the outer ends of the spring plate resiliently urged against the scraper blades to urge the scraper blades against the disc blades of the grain drill, means on the bolt of the sliding plate to secure the spring plate and mounting hinge plate to the sliding plate with the scraper blades on the mounting hinge plate resiliently urged against the disc blades.

2. An adjustable scraper blade device for attachment to a grain drill having double disc blades and a fixed support means between the blades, said fixed support means having a bore therethrough, said device having a longitudinally extending fixed plate with a rear bolt fixed to its rear face and projecting rearward and a front bolt fixed to its front face and projecting forward, said device further comprising a longitudinally extending sliding plate having lateral legs and an apex forming a U-shaped cross section and a longtitudinally extending slot extending along the apex of its U-shape, said rear bolt of the fixed plate being adapted to extend through said bore of the fixed support means with nut means to secure the fixed plate of the device to the fixed support means of the drill, said sliding plate being adapted to receive the front bolt of the fixed plate in the slot of the sliding plate with nut means on the front bolt to secure the sliding plate to the fixed plate said sliding plate being adjutable longitudinally along the length of the slot with the lateral legs of the U shaped sliding plate extending along opposing lateral sides of the fixed plate, said sliding plate having a bolt fixed along its front face adjacent said slot, said device further comprising a spring plate, a hinge plate with curved outer ends, and a pair of scraper blades having slotted ends to receive the curved outer ends of the hinge plate and be pivotally mounted thereto, said spring plate and hinge plate each having a bore to receive the bolt of the sliding plate, said spring plate having resiliently urged outer ends to engage the scraper blades to urge the scraper blades about their pivotal mountings against the disc blades to scrape the disc blades, and nut means on the bolt of the sliding plate to secure the spring plate and hinge plate with the scraper blades mounted thereto to the sliding plate of the device.

* * * * *